United States Patent
Geuze et al.

(10) Patent No.: US 12,485,939 B2
(45) Date of Patent: Dec. 2, 2025

(54) METHOD OF CONTROLLING A DIRECTION OF A TRAJECTORY OF A VEHICLE

(71) Applicant: HARDT IP B.V., Delft (NL)

(72) Inventors: Marijn Jesper Geuze, Rotterdam (NL); Sascha Lamme, Zaandam (NL); Bauke Jan Kooger, Rotterdam (NL); Marinus Wilhelmus Eliza Van Der Meijs, The Hague (NL)

(73) Assignee: Hardt IP BV, Rotterdam (NL)

( * ) Notice: Subject to any disclaimer, the term of this patent is extended or adjusted under 35 U.S.C. 154(b) by 664 days.

(21) Appl. No.: 16/967,780

(22) PCT Filed: Feb. 21, 2019

(86) PCT No.: PCT/NL2019/050114
§ 371 (c)(1),
(2) Date: Aug. 6, 2020

(87) PCT Pub. No.: WO2019/164395
PCT Pub. Date: Aug. 29, 2019

(65) Prior Publication Data
US 2021/0016814 A1    Jan. 21, 2021

(30) Foreign Application Priority Data

Feb. 22, 2018  (NL) ..................................... 2020480

(51) Int. Cl.
*B61L 27/04*  (2006.01)
*B60L 13/06*  (2006.01)
(Continued)

(52) U.S. Cl.
CPC ............... *B61L 27/04* (2013.01); *B60L 13/06* (2013.01); *B61B 13/08* (2013.01); *B61L 11/083* (2013.01);
(Continued)

(58) Field of Classification Search
CPC ................................. B61L 27/04; B61L 13/06
See application file for complete search history.

(56) References Cited

U.S. PATENT DOCUMENTS 1,828,949 A  *  10/1931  Rossman .................. B60L 5/36
                                                              191/55
3,845,720 A     11/1974  Bohn et al.
(Continued)

FOREIGN PATENT DOCUMENTS

DE        707032 C      6/1941
EP     3109998 A1    12/2016
(Continued)

OTHER PUBLICATIONS

International Search Report dated Aug. 6, 2019 issued in corresponding International Application No. PCT/NL2019/050114.
(Continued)

*Primary Examiner* — Jean Paul Cass
(74) *Attorney, Agent, or Firm* — Schwegman Lundberg & Woessner, P.A.

(57) ABSTRACT

A method comprises controlling at least one of a first distance between a first side of the vehicle and the first guidance track and a second distance between a second side of the vehicle and the second guidance track and receiving a direction instruction corresponding to one of the first side and the second side, the one side being a directional side. Having received directional instruction, a directional distance between the directional side of the vehicle and one of the first guidance track and the second guidance track provided at the directional side of the vehicle is controlled. With no contact between vehicle and a guiding track, for example comprising rails, the distance between the vehicle
(Continued)

and the guiding tracks along the trajectory needs to be controlled, preferably at a safe distance. This concept provides such control.

20 Claims, 3 Drawing Sheets

(51) Int. Cl.
    *B61B 13/08*     (2006.01)
    *B61L 11/08*     (2006.01)
    *B61L 23/14*     (2006.01)
    *B61L 25/02*     (2006.01)

(52) U.S. Cl.
    CPC ............ *B61L 23/14* (2013.01); *B61L 25/025* (2013.01); *B61L 2201/00* (2013.01)

(56) References Cited

U.S. PATENT DOCUMENTS

| | | | | |
|---|---|---|---|---|
| 4,641,586 | A * | 2/1987 | Miller | B60L 13/035 104/284 |
| 5,156,092 | A * | 10/1992 | Hirtz | B61B 15/00 104/282 |
| 5,794,535 | A | 8/1998 | Pardes | |
| 11,155,281 | B2 * | 10/2021 | Hosseini | B60L 13/10 |
| 11,364,940 | B1 * | 6/2022 | Williams | B61B 13/00 |
| 2008/0083346 | A1 * | 4/2008 | Fiske | B60L 13/003 104/283 |
| 2014/0261054 | A1 | 9/2014 | Oster | |
| 2015/0262479 | A1 * | 9/2015 | McCrary | G06Q 10/0637 701/117 |
| 2016/0380562 | A1 | 12/2016 | Weber et al. | |
| 2017/0066457 | A1 * | 3/2017 | Avetian | B61B 13/08 |
| 2019/0250617 | A1 * | 8/2019 | Ford | G05D 1/0212 |
| 2021/0253128 | A1 * | 8/2021 | Nister | B60W 60/0027 |

FOREIGN PATENT DOCUMENTS

| | | | | |
|---|---|---|---|---|
| GB | 1574203 | A * | 9/1980 | E01B 29/24 |
| JP | H03-112301 | A | 5/1991 | |
| KR | 10-2008-0007228 | A | 1/2008 | |
| KR | 10-1254975 | B1 | 4/2013 | |
| NL | 2019259 | B1 | 1/2019 | |
| WO | 2019164395 | | 8/2019 | |

OTHER PUBLICATIONS

"International Application Serial No. PCT NL2019 050114, Written Opinion mailed Aug. 6, 2019", 8 pgs.

"International Application Serial No. PCT NL2019 050114, International Preliminary Report on Patentability mailed Sep. 3, 2020", 10 pgs.

* cited by examiner

METHOD OF CONTROLLING A DIRECTION OF A TRAJECTORY OF A VEHICLE

CROSS-REFERENCE TO RELATED APPLICATIONS

This application is the U.S. National Stage of PCT/NL2019/050114, filed Feb. 21, 2019, which claims priority to: Netherlands Patent Application No. 2020480, filed Feb. 22, 2018, the entire contents of both of which are herein incorporated by reference in their entireties.

TECHNICAL FIELD

The various aspects and embodiments thereof relate to guiding a vehicle through a switch of a transportation system and a tube-shaped transportation system in particular.

BACKGROUND

In tubular transportation systems, contact between a vehicle and the tubing is reduced to minimum and preferably prevented at all. This may be achieved by, for example, magnetic suspension. This poses challenges for switching direction from one tube to another at a switch, also this switching process is preferably executed with no contact between the vehicle and the tubing. Furthermore, as vehicles travelling through tubing are intended to travel at high speeds, safe control of positions of vehicles in the tubing is an issue.

SUMMARY

It is preferred to provide control for guiding vehicles safely through switches in transportation systems and in particular for guiding magnetically suspended vehicles through tubular transportation systems—preferably without moving components of the transportation system.

A first aspect provides a method of controlling a direction of a trajectory of a vehicle moving in a vehicle guidance system comprising a first guidance track and a second guidance track. The method comprises controlling at least one of a first distance between a first lateral side of the vehicle and the first guidance track and a second distance between a second lateral side of the vehicle and the second guidance track and receiving a direction instruction corresponding to one of the first lateral side and the second lateral side, the one side being a directional side. Having received directional instruction, a directional distance between the directional side of the vehicle and one of the first guidance track and the second guidance track provided at the directional side of the vehicle is controlled.

With physical switches having rails for guiding wheels of a vehicle, distances between (the wheels of) the vehicle is of no concern, as the vehicle is guided by virtue of contact between the rails and the wheels. With no contact between vehicle and a guiding track, for example comprising rails, the distance between the vehicle and the guiding tracks along the trajectory needs to be controlled, preferably at a safe distance.

An embodiment comprises determining whether a first safety point has been passed, obtaining a default direction corresponding to one of the first lateral side and the second lateral side and if the safety point has been passed, controlling a default distance between a default lateral side of the vehicle corresponding to the default direction and one of the first guidance track and the second guidance track adjacent to the default lateral side.

As indicated above, vehicles in tubular transportation systems are intended to travel at several hundreds of kilometres per hour. At such speeds and with vehicles carrying a significant amount of people or an equivalent mass of goods, control of safe switching is very important. Having a significant amount of momentum, changing direction at a location of a switch or very close before reaching a switch may result in a dangerous situation. Such situation is preferably avoided. For that reason, any instructions for changing direction received beyond the point of no return are preferably ignored.

Another embodiment further comprises obtaining a safety distance interval, and upon receiving the direction instruction. If the direction instruction comprises the first direction, it is checked whether the first distance is within the safety distance interval.

If this is the case, the first distance is controlled within the first distance interval and if this is not the case, the second distance is controlled within the second distance interval. If the direction instruction comprises the second direction it is checked whether the second distance is within the safety distance interval. If this is the case, the second distance is controlled within the second distance interval and if this is not the case, the first distance is controlled within the first distance interval.

This means that if the vehicle cannot be controlled to the instructed direction at a particular point, the vehicle is directed to the opposite direction. In this way, the vehicle is always controlled to a particular direction, thus preventing potential collisions.

A further embodiment comprises determining whether a second safety point has been passed and, if it has been determined that the second safety point has been passed, controlling at least one of a first distance between a first lateral side of the vehicle and the first guidance track and a second distance between a second lateral side of the vehicle and the second guidance track.

The second safety point is provided at a point beyond the switch. Hence, the second safety point indicates the position of vehicle may be controlled again in normal operation between the guiding tracks.

A second aspect provides a control system for controlling a direction of a trajectory of a vehicle moving in a vehicle guidance system comprising a first guidance track and a second guidance track. The control system comprises a processing module. The processing module is arranged to determine a first distance between a first lateral side of the vehicle and the first guidance track and determine a second distance between a second lateral side of the vehicle and the second guidance track. The control system further comprises an input module, arranged to receive a direction instruction and a control module. The control module is arranged to, based on the direction instruction, execute at least one of control the first distance, based on the determined first distance and control the second distance. based on the determined second distance.

a third aspect provides a vehicle for moving in a vehicle guidance system comprising a first guidance track and a second guidance track, comprising the control system according to the second aspect.

A fourth aspect provides a vehicle guidance system for guiding a vehicle, the vehicle guidance system comprising a first guidance track and a second guidance track and the control system according to the second aspect.

BRIEF DESCRIPTION OF THE DRAWINGS

The various aspects and embodiments thereof will now be discussed in further detail in conjunction with Figures. In the Figures.

DETAILED DESCRIPTION

Figure 1:
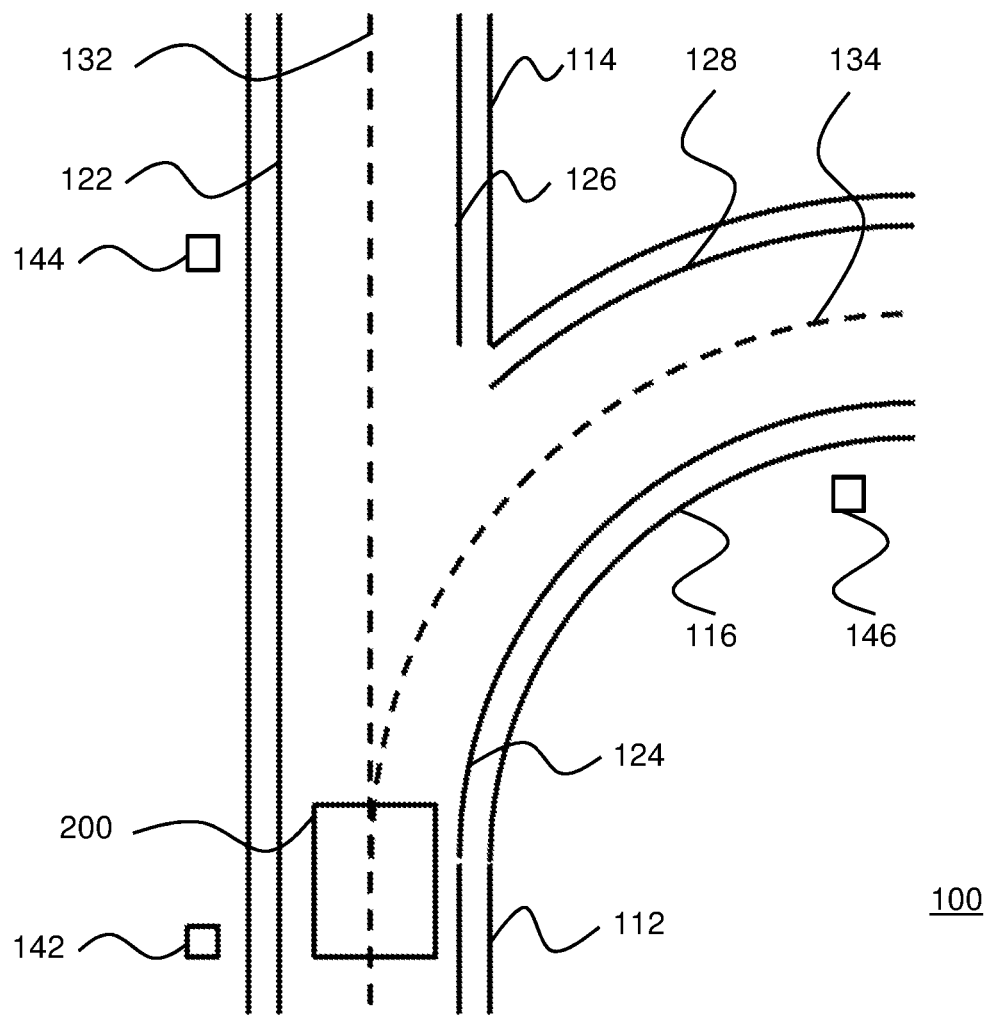
FIG. 1: shows a top view of a transportation system.

FIG. 1 shows a switch in a transportation system 100. In this embodiment, the transportation system 100 comprises interconnected tubes, which tubes are connected at switches. FIG. 1 shows a first tube 112, a second tube 114 in extension of the first tube 112 and a third tube 116 branching off from the first tube 112 and the second tube 116. The transportation system 100 is arranged for guiding a vehicle 200. The vehicle 200 is preferably suspended from a first support track 132. The first support track 132 may be provided above the vehicle 200, attracting the vehicle 200, below the vehicle 200 and pushing the vehicle 200 up, or a combination thereof.

At the sides of the tubes of the transportation system 100, steel rails are provided as guidance tracks. At the left—as viewed in the drawing of FIG. 1—a first rail 122 is provided. At the lower right, branching from the first tube 112 to the third tube 116, a second rail 124 is provided. At the top right, a third rail 126 is provided in the second tube and a fourth rail 128 is provided at the side of the third tube. In this embodiment, the rails are provided as continuous tracks, but in another embodiment, they may be provided as a track of separate elements.

At a pre-determined distance from the fork in the transportation system 100, a first beacon 142 is provided in or adjacent to the first tube 112.

Figure 2:
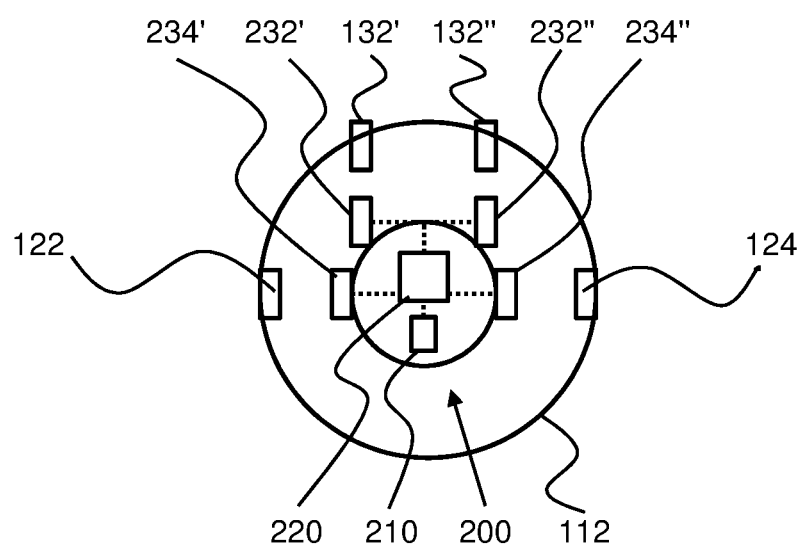
FIG. 2: shows a cross-section of a transportation system and a vehicle.

FIG. 2 shows a cross-section of the first tube 112 with the vehicle 200 in it. At opposite sides of the first tube 112, the first rail 122 and the second rail 124 are provided in the first tube 112. In this embodiment, the rails are provided at substantially the same height, at the middle of the first tube 112 and at an annular distance of 180°. In another embodiment, the rails are provided at different heights and at different annular distances, for example 90° apart.

In this embodiment, the first support track 132 comprises a first support rail 132' and a second support rail 132". The vehicle 200 is in this example suspended from the support rails 132 by means of electromagnetic support modules. A first electromagnetic support module 232' is provided for interaction with the first support rail 132' and a second electromagnetic support module 232" is provided for interaction with the second support rail 132". The support rails 132 may be provided with conductors that may be powered for propelling the vehicle 200 in the transportation system 100, as explained in patent application NL2019259.

Whereas such type of suspension is preferred, also other type of modules may be used for suspending the vehicle 200 within the tubing. Such suspension may be provide at the side of the vehicle, at the bottom or at the top and may be magnetic, electrical, mechanical, other, or a combination thereof. The amount of contact between the transportation system and the vehicle 200 is preferably reduced to the smallest possible amount or even mitigated to reduce any type of friction.

At the sides of the vehicle 200 and the lateral sides in particular, guiding electromagnetic modules 234 are provided. At the left, a first electromagnetic guiding module 234' is provided and at the right, a second electromagnetic guiding module 234" is provided. The electromagnetic modules are controlled by a position control module 220 that controls the currents flowing through the electromagnetic modules. The position control module 220 is, in turn, controlled by a vehicle control module 210. In one example, the position control module 220 and the vehicle control module 210 are provided in one housing or even in one single circuit.

By controlling the powering of the electromagnetic support modules 232, the height of the vehicle 200 in the first tube 112 may be controlled, as well as the transversal displacement—in the lengthwise direction of the tubing, for example, but not strictly limited to, in accordance with technology disclosed by patent application NL2019259.

By powering the guiding electromagnetic modules 234, the lateral position of the vehicle 200 in the first tube 112 may be controlled. The guiding electromagnetic modules 234 are in this embodiment provided at lateral sides of the vehicle 200, i.e. at sides other than top, bottom, front and rear sides. In case of a substantially cuboid shape or lying cylindrical shape of the vehicle 200, this means that the electromagnetic guiding modules 234 are provided at the left and right sides of the vehicle 200. By powering, for example, the first guiding electromagnetic module 234', attraction between the first guiding electromagnetic module 234' and the first rail 122 may be controlled.

Likewise, by powering the second electromagnetic module 234", attraction between the second guiding electromagnetic module 234" and the second rail 124 may be controlled. In this way, the lateral position of the vehicle 200 in the first tube 112 may be controlled. For enabling such control, the first rail 122 and the second rail 124 preferably comprise a ferromagnetic material, for example steel.

For accurate control of the vehicle 200, the lateral position of the vehicle 200 in the first tube 112 needs to be determined. Preferably, distances between the vehicle 200 and the first rail 122 and between the vehicle 200 and the second rail 124 are determined. Alternatively or additionally, if another guiding track is provided in the first tube 112, the distance between vehicle and the guiding tracks on either side of the vehicle is determined.

The distances between the vehicle 200 and the rails on either side may be determined by means of the electromagnetic guiding modules 234. With a constant current flowing through, for example, the first electromagnetic guiding module 234', the magnetic field in the first electromagnetic guiding module 234' varies depending on the distance between the first rail 122. Alternatively or additionally, the distances between the vehicle on one hand and the rails on the other hand are monitored by means of another sensor, including, but not limited to, optical sensors combined with one or more light sources like LED, laser or other, other electromagnetic sensing systems comprising source(s) and sensor(s), mechanical sensors, other, or a combination thereof.

In another embodiment, the lateral position of the vehicle 200 in the first tube 112 is controlled by means of the first support track 132 and the electromagnetic support modules 232 in accordance with technology disclosed by patent application NL2019259. In such embodiment, the electromagnetic guiding modules 234 may be omitted.

Figure 3:
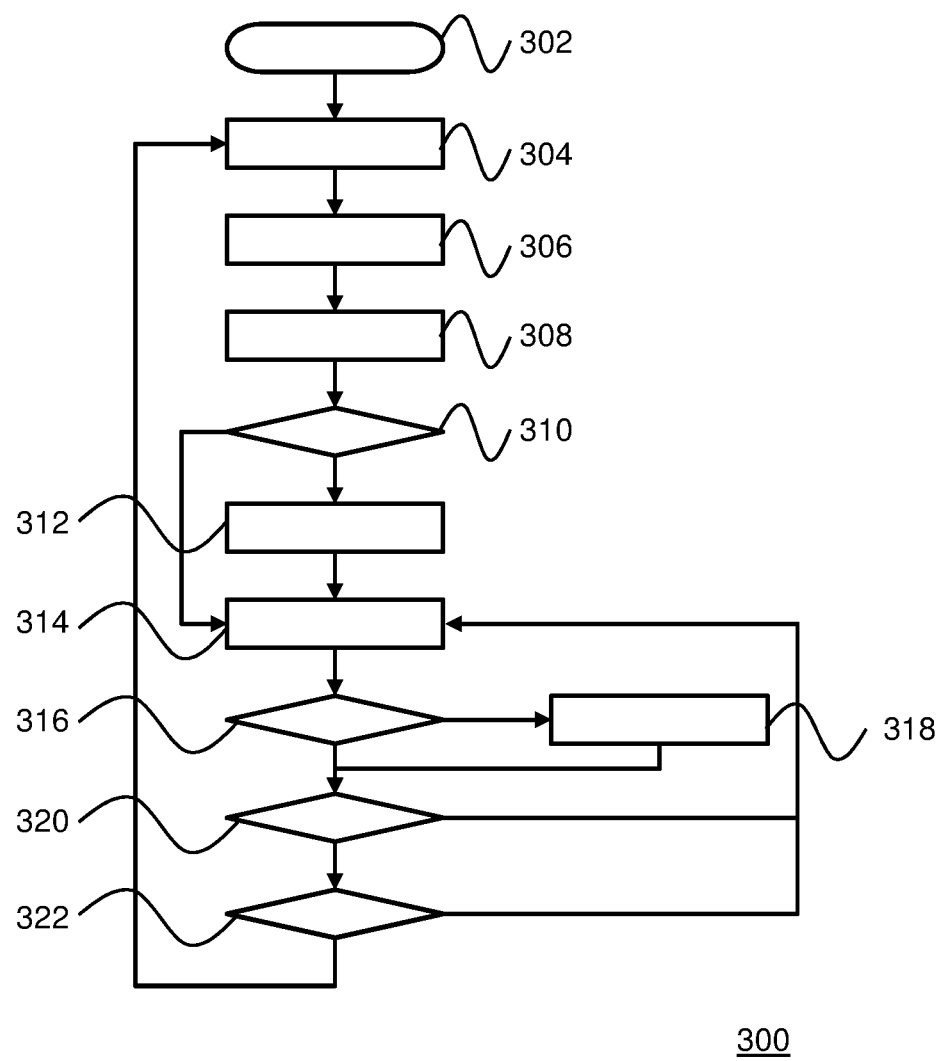
FIG. 3: shows a flowchart depicting a method for controlling the vehicle in the transportation system.

By controlling the distance between one or both lateral sides of the vehicle 200 and the rails at the sides of the first tube 112, but also of the second tube 114 and the third tube 116, the vehicle 200 may be controlled to move from the first tube 112 to either the second tube 114 or the third tube 116. This is discussed below in further detail, in conjunction with FIG. 1, FIG. 2 and FIG. 3. FIG. 3 shows a flowchart 3, of which the various parts are summarised below:

- 302 start
- 304 set default direction
- 306 control at least one of left and right distance
- 308 receive direction instruction
- 310 in front of first safety point?
- 312 set instruction direction as default
- 314 control distance at default side
- 316 lateral distance between vehicle and rail at default within safety?
- 318 set default side to opposite of earlier default side
- 320 second safety point passed?
- 322 distance to side opposite to direction side within control margin?

The procedure starts in a terminator 302. At this point, the vehicle 200 is located in the transportation system 100 at the position as depicted by FIG. 1. At this position, the first tube 112 has a substantially circular cross-section. With the vehicle 200 being positioned centered relative to the first support track 132, distances between the vehicle 200 and the guiding rails (also referred to as guide rails) may be well controlled by means of the electromagnetic guiding modules 234. Preferably, the distances between lateral sides of the vehicle 200 and the guiding rails are controlled within a pre-determined control distance interval that defines a control distance or control distances. The intervals are chosen such that the lateral position of the vehicle 200 may be safely controlled in the tubing of the transportation system 100 between switches.

The procedure continues to step 304 in which a default direction is set. The default direction is a direction the vehicle 200 is to be directed to in case of absence of receipt of a particular instruction. The procedure continues to step 306, in which at least one of a left and right distance between the vehicle 200 and at least one of the first rail 122 and the second rail 124 is controlled. The objective of the controlling in step 306 is to keep the vehicle 200 substantially in the centre of the first tube 112, at least in the middle between the first rail 122 and the second rail 124.

In step 308, a direction instruction is received by the vehicle control module 210. In this embodiment, the vehicle control module 210 is provided in the vehicle 200. Alternatively, the vehicle control module 210 may be provided at a stationary location, at which it controls various components of the vehicle 200 via a wireless link. The direction instruction comprises a direction to take: left or right. Alternatively or additionally, the instruction comprises information whether to continue in a straight line or to take a bend. It is noted that switches having three or more directional options, rather than two as depicted by FIG. 1 may be available as well. For such switches, the instruction may comprises a wider variety of instructions, like left-right-straight ahead, a number 1 through 4 in case of four branches, other, or a combination thereof.

Having received the direction instruction, the vehicle control module 210 determines at step 310 whether the vehicle 200 has passed a first safety point. The first safety point is defined at a particular distance ahead of a switch and may be a fixed point or, additionally or alternatively, a dynamic point. If the safety point is defined at a fixed point, it may be indicated by means of a beacon in the transportation system 100, for example by means of the first beacon 142. The vehicle 200 comprises a sensor for detecting the first beacon 142, which sensor is connected to the vehicle control module 210.

In case of a dynamic position of the first safety point, the position of the first safety point may be defined based on a vehicle parameter, including velocity of the vehicle 200, a load of the vehicle 200, position data of the vehicle 200 like at least one of yaw, roll and pitch, other data or a combination thereof. Alternatively or additionally, the first safety point may be defined as a location in the transportation system 100 at which the tubing is forked at such width that both distances between lateral sides of the vehicle 200 and the guidance tracks on the sides cannot be both controlled with the control intervals or control distances.

In this way, the first safety point is defined as a point of no return: any directional instruction received beyond that point is ignored by the vehicle control module 210. Having passed this point of no return, the instructed direction is set as the default distance in step 312. If no direction instructions have been received, the default direction as defined in step 304 remains unchanged.

The procedure depicted by the flowchart 300 will be further elucidated by means of an example in which an instruction is received for the vehicle to travel from the first tube segment 112 to the third tube segment 116.

In step 314, the distance between the vehicle 200 and the second rail 124 is controlled, as the second rail 124 corresponds to the side of the vehicle that corresponds to the instructed direction. Preferably, the distance between the vehicle 200 and the second rail 124 is controlled within the pre-determined control distance interval. A distance between the vehicle 200 and the first rail 122 is not controlled or not controlled anymore: a single distance at a single side will be controlled. As a result, the vehicle 200 will follow the second rail 124 and take a turn from the first tube 112 to the third tube 116. Furthermore, the vehicle 200 will switch from the first support track 132 to a second support track 134 provided in the third tube 116 and subsequently continue its itinerary through the transportation system 100.

The vehicle 200 is to be guided at a safe distance from the second rail 124, but this distance should not be too far off the second rail 124 to prevent collision of the vehicle 200 into the wall between the second tube 114 and the third tube 116. For this reason, a safety distance or a safety distance interval is defined and obtained by the vehicle control module 210. The safety distance value or safety distance interval is preferably larger than the control distance interval. This may be a fixed value or a dynamic value that may be defined based on a vehicle parameter, including velocity of the vehicle 200, a load of the vehicle 200, position data of the vehicle 200 like at least one of yaw, roll and pitch, other data or a combination thereof.

The distance between the vehicle 200 and a guiding track at the instruction direction side is checked in step 316. If the distance between the vehicle 200 and the second rail 124 is above the safety distance value or outside and in particular above the safety distance interval, the process branches to step 318. In step 318, the side opposite to the earlier default side is set as the default side. In the example discussed here, the earlier default side is the right side.

When the side opposite to the earlier default side is set as the default side, this means that instead of the vehicle 200 being directed towards the third tube 116, the vehicle 200 will be directed towards the second tube 114. If, on the other hand, the distance between the vehicle 200 and the second rail 124 is within the safety interval, the process continues from step 316 to step 320.

In step 320, the vehicle control module 210 checks whether a second safety control point has been passed. In one embodiment, the second safety control point is a beacon at a fixed location. Such fixed location is preferably provided at a point near a tube of the transportation system 100 close to a switch. In case of a dynamic position of the second safety control point, the position of the second safety control point may be defined based on a vehicle parameter, including velocity of the vehicle 200, a load of the vehicle 200, position data of the vehicle 200 like at least one of yaw, roll and pitch, other data or a combination thereof.

FIG. 1 shows a second beacon 144 and a third beacon 146. With the right direction being the instructed and followed direction by the vehicle 200, the second beacon 144 defines the second safety point. The second safety point defines a position in the transportation system 100 at which the vehicle has left the switch and has entered another continuous tube or tube segment. And having left a switch, the lateral position of the vehicle 200 may be controlled again at both sides of the vehicle 200.

Hence, if the second safety control point has not been passed, yet, the procedure branches back to step 314 at which the distance between the vehicle 200 and a guide rail at the default side is controlled within the control distance interval. If it is determined the second safety control point has been passed, the process continues to step 322 at which the distance between the vehicle 200 and a further guiding rail at the non-instructed side of the vehicle is checked to the control distance or control distance interval.

In the example discussed here, the guiding rail at the non-instructed side beyond the second safety control point is a fourth guide rail 128. If the distance between the vehicle 200 and the fourth guide rail 128 is below the control distance or within the control distance interval, the process continues to step 304 for normal operation in a further leg of the transportation system 200. If the distance between the vehicle 200 and the fourth guide rail 128 is above the control distance or the control distance interval, the process branches back to step 314.

The various aspects and examples thereof may be summarised as provided in the numbered examples below. These examples are provide for supporting the general innovative concept and are not to be interpreted as limiting the breadth of that concept which is defined by the claims In the description above, it will be understood that when an element such as layer, region or substrate is referred to as being "on" or "onto" another element, the element is either directly on the other element, or intervening elements may also be present. Also, it will be understood that the values given in the description above, are given by way of example and that other values may be possible and/or may be strived for.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

It is to be noted that the figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described. The word 'comprising' does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various parameters and values thereof disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A method of controlling a direction of a trajectory of a vehicle moving in a vehicle guidance system comprising: a switch comprising a first tube, a second tube and a third tube, a first guidance track ranging from the first tube to the second tube, and a second guidance track ranging from the first tube to the third tube, the method comprising:
   obtaining a default direction prior to entering the switch;
   electromagnetically controlling at least one of a first distance between a first lateral side of the vehicle and the first guidance track and a second distance between a second lateral side of the vehicle and the second guidance track;
   receiving a direction instruction corresponding to one of a first trajectory from the first tube to the second tube or a second trajectory from the first tube to the third tube;
   after receiving the direction instruction, determining whether the vehicle is closer to the switch than a first safety point is to the switch:
   in response to determining that the vehicle is closer to the switch than the first safety point is from the switch, ignoring the direction instruction and continuing along the default direction;
   in response to determining that the vehicle is farther from the switch than the first safety point is from the switch, attempting to control only one of the first distance or the second distance to be within a control distance interval, the one of the first distance or the second distance corresponding to the one of the first trajectory or the second trajectory corresponding to the direction instruction;
   after attempting to control the one of the first distance and the second distance, determining whether the one of the first distance and the second distance is larger than a safety distance interval, the safety distance interval larger than the control distance interval; and
   in response to determining that the one of the first distance and the second distance is larger than the safety distance interval, switching from attempting to control the one of the first distance or the second distance to controlling, within the control distance interval, the other of the first distance and the second distance such that the vehicle travels in the other of the first trajectory or the second trajectory.

2. The method according to claim 1, further comprising:
   electromagnetically controlling a height and transverse motion of the vehicle in the first tube using a first support track of the first tube and first and second support modules of the vehicle, the first support track having first and second support rails that are electromagnetically coupled with the first and second support modules of the vehicle, the first and second support modules of the vehicle symmetrically disposed on opposing sides of the vehicle and separated by a smaller angle than an angle separating a first guiding module and a second guiding module of the vehicle that electromagnetically couple to the first guidance track and the second guidance track respectively; and electromagnetically controlling a height and transverse motion of the vehicle in one of the second tube or the third tube using a second support track of the one of the second tube or the third tube and the first and second support modules of the vehicle, the second support track contiguous with the first support track at the switch.

3. The method according to claim 1, wherein determining whether the vehicle is closer to the switch than the first safety point comprises determining whether a fixed beacon disposed in the first tube has been passed by the vehicle.

4. The method according to claim 1, further comprising in response to receiving the direction instruction:
determining whether the direction instruction indicates the first trajectory:
in response to determining that the direction instruction indicates the first trajectory and that the first distance is within the safety distance interval, controlling the first distance within the control distance interval; and
in response to determining that the direction instruction indicates the first trajectory and that the first distance is outside the safety distance interval, controlling the second distance within the control distance interval; and
determining whether the direction instruction indicates the second trajectory:
in response to determining that the direction instruction indicates the second trajectory and that the second distance is within the safety distance interval, controlling the second distance within the control distance interval; and
in response to determining that the direction instruction indicates the second trajectory and that the second distance is outside the safety distance interval, controlling the first distance within the control distance interval.

5. The method according to claim 1, wherein the safety distance interval is set dynamically and dependent on at least one of:
a velocity of the vehicle;
a curvature of a guidance track;
a load of the vehicle;
an acceleration of the vehicle;
total mass of the vehicle;
position of the vehicle in the vehicle guidance system; or
at least one of yaw, roll and pitch of the vehicle.

6. The method according to claim 1, further comprising:
determining that a second safety point has been passed, the second safety point disposed on an opposite side of the switch as the first safety point; and
in response to determining that the second safety point has been passed, electromagnetically controlling both of the first distance between the first lateral side of the vehicle and the first guidance track and the second distance between the second lateral side of the vehicle and the second guidance track.

7. The method according to claim 1, wherein:
the first distance is a distance between the first guidance track and a first magnet module provided at the first lateral side of the vehicle;
the second distance is a distance between the second guidance track and a second magnet module provided at the second lateral side of the vehicle; and
controlling a distance comprises electromagnetically controlling a magnetic force between at least one of the first guidance track and the first magnet module or the second guidance track and the second magnet module.

8. The method according to claim 7, wherein the first magnet module and the second magnet module comprise electromagnets and controlling the magnetic force comprises controlling a level of a current flowing through the electromagnets.

9. The method according to claim 7, wherein a first magnet position of the first magnet module relative to the vehicle and a second magnet position of the second magnet module relative to the vehicle are adjustable, and electromagnetically controlling magnetic forces comprises adjusting at least one of the first magnet position or the second magnet position.

10. A control system for controlling a direction of a trajectory of a vehicle moving in a vehicle guidance system comprising: a switch comprising a first tube, a second tube and a third tube, a first guidance track ranging from the first tube to the second tube, and a second guidance track, ranging from the first tube to the third tube;
the control system comprising:
a processing module, arranged to:
determine a first distance between a first lateral side of the vehicle and the first guidance track that corresponds to a first trajectory from the first tube to the second tube;
determine a second distance between a second lateral side of the vehicle and the second guidance track that corresponds to a second trajectory from the first tube to the third tube, the first trajectory being different from the second trajectory:
an input module, arranged to receive a default direction prior to entering the switch and a direction instruction subsequent to reception of the default direction;
a control module, arranged to, based on the direction instruction, execute at least one of:
electromagnetically control the first distance;
electromagnetically control the second distance;
the processing module being further arranged to:
after receiving the direction instruction, determine whether the vehicle is closer to the switch than a first safety point is to the switch;
in response to a determination that the vehicle is closer to the switch than the first safety point is from the switch, ignore the direction instruction and continue along the default direction;
in response to a determination that the vehicle is farther from the switch than the first safety point is from the switch, attempt to electromagnetically control only one of the first distance or the second distance to be within a control distance interval, the one of the first distance or the second distance corresponding to the one of the first trajectory or the second trajectory corresponding to the direction instruction;
after an attempt to control the one of the first distance and the second distance, determine whether the one of the first distance and the second distance is larger than a safety distance interval, the safety distance interval larger than the control distance interval;
in response to a determination that the one of the first distance and the second distance is larger than the safety distance interval, switch from the attempt to control the one of the first distance or the second distance to electromagnetically control, within the control distance interval, the other of the first distance and the second distance such that the vehicle travels in the other of the first trajectory or the second trajectory;

determine whether a second safety point has been passed, the second safety point disposed on an opposite side of the switch as the first safety point; and in response to a determination that the second safety point has been passed, electromagnetically control, along the one of the first trajectory or the second trajectory of the vehicle in the vehicle guidance system both of the first distance between the first lateral side of the vehicle and the first guidance track and the second distance between the second lateral side of the vehicle and the second guidance track.

11. A vehicle for moving in the vehicle guidance system comprising the first guidance track and the second guidance track, comprising the control system according to claim 10.

12. The vehicle according to claim 11, further comprising a first magnet module provided at the first lateral side of the vehicle and a second magnet module provided at the second lateral side of the vehicle and wherein the control system is arranged to:

electromagnetically control the first distance by controlling a first magnetic force between the first magnet module and the first guidance track; and electromagnetically control the second distance by controlling a second magnetic force between the second magnet module and the second guidance track.

13. The vehicle according to claim 12, wherein the control system is arranged to control:

a first current flowing through the first magnet module provided at the first lateral side of the vehicle; and a second current flowing through the second magnet module provided at the second lateral side of the vehicle.

14. A vehicle guidance system for guiding a vehicle, the vehicle guidance system comprising the first guidance track and the second guidance track and the control system according to claim 10.

15. The vehicle guidance system according to claim 14, comprising interconnected tubing, wherein the first guidance track and the second guidance track are provided along at least part of an inner wall of the first tube, the second tube, and the third tube.

16. The method according to claim 1, wherein the first safety point is set dynamically and dependent on a vehicle parameter that includes at least one of velocity, load, yaw, pitch, or roll.

17. The control system according to claim 10, wherein the first safety point is set dynamically and dependent on a vehicle parameter that includes at least one of velocity, load, yaw, pitch, or roll.

18. The method according to claim 6, wherein the second safety point is set dynamically and dependent on a vehicle parameter that includes at least one of velocity, load, yaw, pitch, or roll.

19. The control system according to claim 10, wherein the first safety point is set dynamically and dependent on a vehicle parameter that includes at least one of velocity, load, yaw, pitch, or roll.

20. The method according to claim 6, wherein in response to determining that the switch has been passed but the second safety point has not been passed, electromagnetically controlling only one of the first distance between the first lateral side of the vehicle and the first guidance track or the second distance between the second lateral side of the vehicle and the second guidance track.

* * * * *